United States Patent
Koday

[19]

[11] Patent Number: 5,839,632
[45] Date of Patent: Nov. 24, 1998

[54] ROTATABLE WATER BOTTLE HOLDER

[76] Inventor: Yohai Koday, 7317 Brentwood Rd., Philadelphia, Pa. 19151

[21] Appl. No.: 917,534

[22] Filed: Aug. 26, 1997

[51] Int. Cl.[6] ..................................................... B62J 11/00
[52] U.S. Cl. ......................... 224/414; 224/425; 224/434; 224/443; 224/462; 224/553; 248/311.2; 248/292.13
[58] Field of Search ................................... 224/400, 412, 224/414, 419, 420, 425, 424, 428, 441, 443, 446, 447, 450, 459, 461, 462, 545, 548, 567, 570, 434; 248/311.2, 292.13; D12/411

[56] References Cited

U.S. PATENT DOCUMENTS

| | | | |
|---|---|---|---|
| 453,311 | 6/1891 | Blood | 224/420 |
| 573,502 | 12/1896 | Cahill | 224/425 |
| 1,735,212 | 11/1929 | Pawsat | 224/420 |
| 2,086,355 | 7/1937 | Eansor | 248/292.13 |
| 2,439,623 | 4/1948 | Howells | 224/570 |
| 3,021,106 | 2/1962 | Kramer | 248/311.2 |
| 3,734,439 | 5/1973 | Wintz | 224/414 |
| 4,256,281 | 3/1981 | Harris et al. | 224/414 |
| 4,830,239 | 5/1989 | Tackles . | |
| 5,040,709 | 8/1991 | Neugent . | |
| 5,060,832 | 10/1991 | Link . | |
| 5,170,981 | 12/1992 | Lin . | |
| 5,326,006 | 7/1994 | Girard, Jr. . | |
| 5,425,485 | 6/1995 | Kawand . | |
| 5,522,527 | 6/1996 | Tsai | 224/414 |
| 5,704,525 | 1/1998 | Barro | 224/414 |

*Primary Examiner*—Allan N. Shoap
*Assistant Examiner*—Gregory M. Vidovich
*Attorney, Agent, or Firm*—Stuart M. Goldstein, Esq.

[57] ABSTRACT

A water bottle holder for a bicycle which employs a flexible spring-operated cage with tension, that allows for the easy removal and replacement of the bottle by the rider, as well as in holding the bottle securely while retained in the cage during a ride. The mechanism is designed to remain safely operable even after multiple usages. The holder itself comprises a cage element with main and front support members. The cage element is mounted on the frame of a bicycle such that it is rotatable right and left, in a horizontal plane over and parallel to the frame. In this manner, the bottle retained in the holder may be easily removed for use during the ride, without loss of concentration or duress to the rider.

6 Claims, 4 Drawing Sheets

5,839,632

ROTATABLE WATER BOTTLE HOLDER

BACKGROUND OF THE INVENTION

The present invention relates to a water bottle holder which is adapted to be attachably mounted to the frame tube member of a bicycle.

The water bottle holder is a common accessary used on bicycles. Such an accessary usually consists of a flexible plastic bottle which is contained in a cage comprising bent wire or tubular members which is attached to the frame member of a bicycle by a mounting bracket. Examples of such known cage units are found in U.S. Pat. Nos. 4,830,239, 5,060,832, and 5,170,981.

Conventional bicycle bottle holders allow the rider, while riding, to remove the bottle and take a drink while riding. However, after removing and replacing the bottle from the holder several times, the holder becomes distended. The bottle can no longer be held securely and can eject from the holder during a ride. This can be dangerous not only for the rider, but others as well.

In addition, many standard bicycle frames, such as those made specifically for women and mountain bikes, are built with two frame members in very close proximity to each other. In these instances, and most others, accessibility to water bottles mounted in holders is difficult. The bicyclist routinely has a problem in reaching for the bottle, given its position directly underneath him, often obstructed by frame members.

SUMMARY OF THE INVENTION

It is the object of the present invention to overcome the limitations and disadvantages of existing water bottle holders for bicycles.

It is another object of the invention to provide a bicycle bottle holder which is mounted for easy access by the bicyclist, while the bicycle is in use.

It is a further object of the invention to provide a bicycle bottle holder which is rotatably mounted on the bicycle frame to allow quick and easy access for the removal of the bottle from the bicycle cage and reinsertion of the bottle into the cage.

It is still another object of the invention to provide a bicycle bottle holder which is moveable in a flexible back and forth direction to provide easy access to the bicyclist while the bicycle is in use.

It is another object of the invention to provide a bicycle bottle holder which is easily mountable on a frame member of a bicycle and is simple to use.

It is still a further object of the invention to provide a bicycle bottle holder which will immovably hold a bottle in place and is durable in use.

The present invention is directed to a bicycle bottle holder which enhances the safety and efficiency of the mechanism. The bottle holder of the present invention employs a flexible spring-operated cage with tension, that allows for the easy removal and replacement of the bottle by the rider, as well as in holding the bottle securely while retained in the cage during a ride. The mechanism is designed to remain safely operable even after multiple usages.

The holder itself comprises a cage element with main and front support members. The cage element is mounted on the frame of a bicycle such that it is rotatable right and left, in a horizontal plane over and parallel to the frame. In this manner, the bottle retained in the holder may be easily removed for use during the ride, without loss of concentration or duress to the rider.

The novel features which are considered as characteristic of the invention are set forth in particular in the appended claims. However, both as to their design, construction, and use, together with additional features and advantages thereof, are best understood upon review of the following detailed description we have referenced to the accompanying drawings.

DETAILED DESCRIPTION OF THE INVENTION

Figure 1:
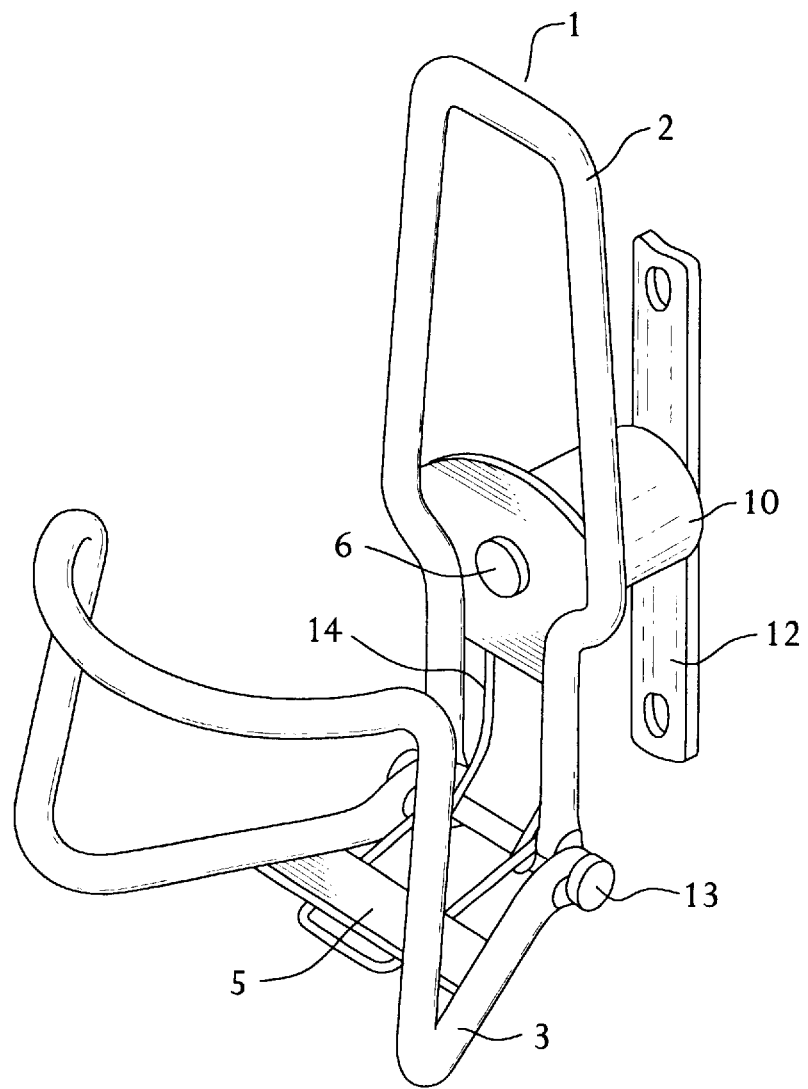
FIG. 1 is a perspective view of one embodiment of the present invention.
Figure 2:
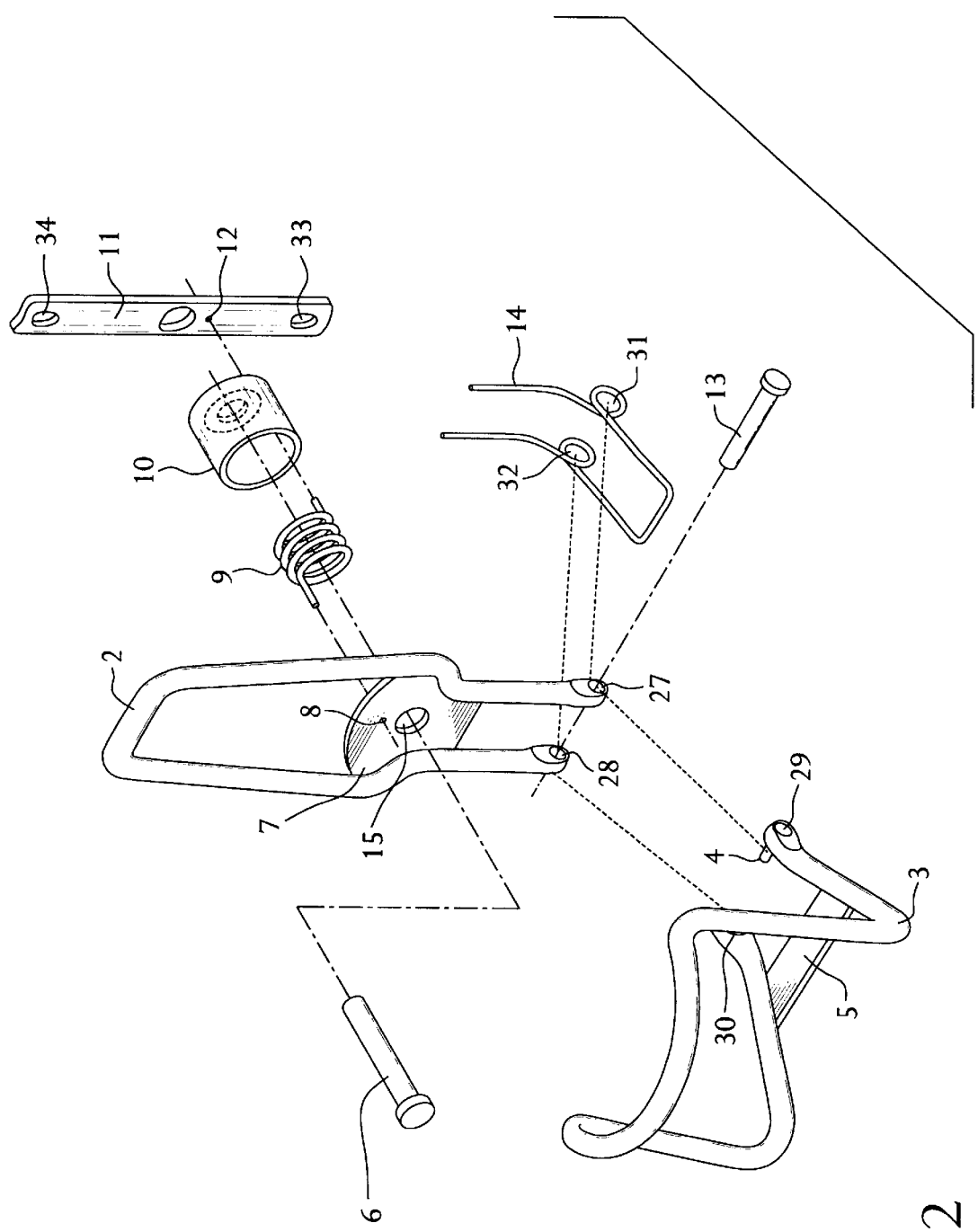
FIG. 2 is an exploded view of the first embodiment of the present invention.

FIGS. 1 and 2 depict the first embodiment of the present invention. Bicycle bottle holder 1 comprises main support member 2 and front support member 3, which makes up the cage of the holder. Front support member 3 holds a bottle in place with pressure received from spring 14, which pushes against the bottom of front support member 10 with the help of plate 5, welded to front support member 3. Spring 14 is connected to main support member 2 and front support member 3 by pin 13 insertably mounted in openings 31 and 32 of the spring, 27 and 28 at the lower end of main support member 2, and 29 and 30 at the lower end of front support member 3. Main support member 2 holds the bottle in place with pressure received from front support 3.

Front support member 3 comprises a small pin 4 that serves as a stopper to keep front support member 3 from touching main support 2. Front support member 3 and spring 14 attach together to main support member 2 by means of pin 13. Welded to the sides of main support 2 is main plate 7. At the center of plate 7 is a hole 15 for the insertion of pin 6. Pin 6, once inserted through hole 15, supports spring 9 and sleeve 10 which can contain or be independent of ball bearings. The ends of spring 9 extend into hole 8 in main plate 7 and hole 12 in mounting plate 11. Plate 11 attaches to the bicycle frame member by conventional means through holes 33 and 34. Sleeve 10 facilitates the smooth rotation of bottle holder 1 side to side over the frame of a bicycle, in a horizontal plane parallel to the frame on which the holder is mounted.

Figure 3:
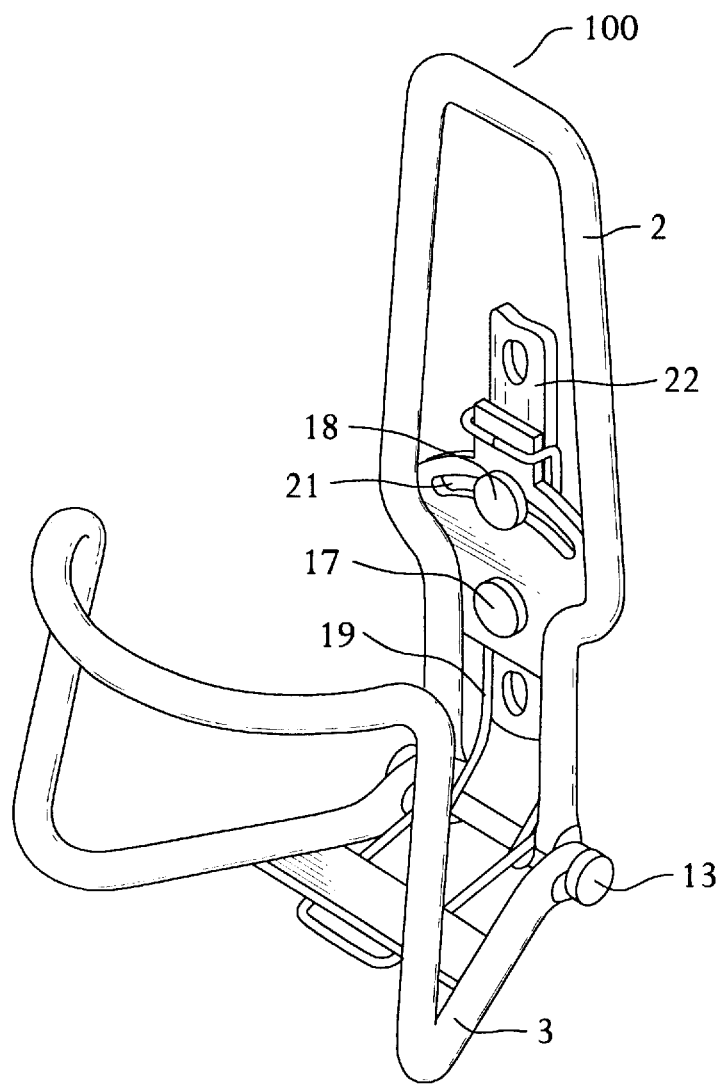
FIG. 3 is a perspective view of a second embodiment of the present invention.
Figure 4:
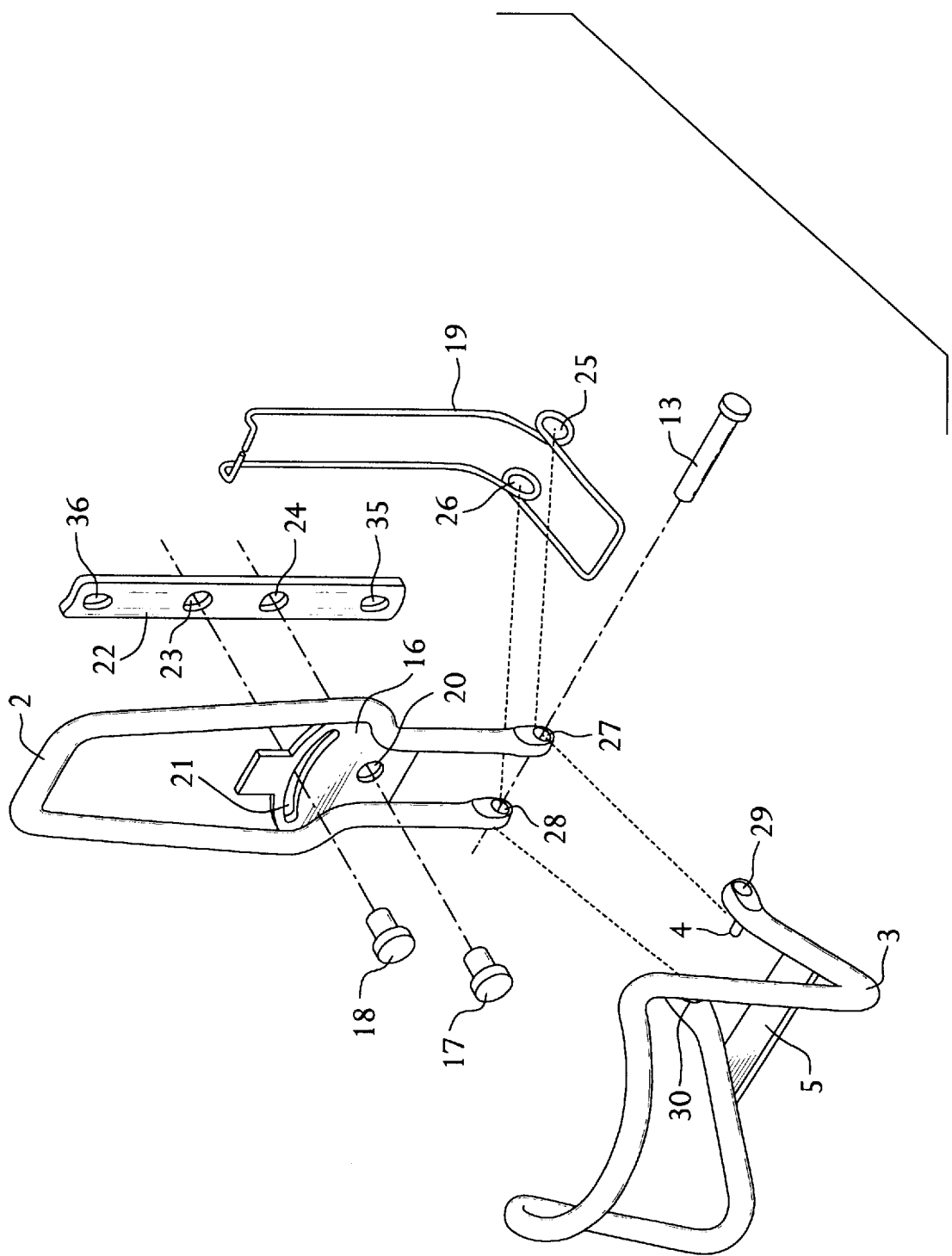
FIG. 4 is an exploded view of the second embodiment of the present invention.

The second embodiment of the invention comprises bottle holder 100, shown in FIGS. 3 and 4. Holder 100 also consists of main support member 2 and front support member 3, with stopper pin 4. This second embodiment, however, provides a somewhat different means of allowing rotation of the bottle holder in the horizontal plane parallel to the bicycle frame on which it is mounted. In this second embodiment, main plate 16 mounted on main support member 2 comprises slot 21 and hole 20. Pin 17 extends through hole 20 to secure plate 16 to bicycle frame mounting plate 22 through hole 24. Pin 18 is adapted for insertion into slot 21 and then for attachment to plate 22 through hole 23. Pin 18, traveling along the curve of slot 21, allows for free rotational movement of the bottle holder right and left in a horizontal plane parallel to the frame of the bicycle. Spring 19 is connected to main support member 2 and front support member 3 by pin 13 insertably mounted in openings 25 and 26 of the spring, 27 and 28 at the lower end of main support member 2, and 29 and 30 at the lower end of front support member 3. Plate 22 attaches to the bicycle frame by conventional means through holes 35 and 36.

Both bottle holder embodiments, when mounted onto a bicycle frame member, will allow the holder to rotate right and left in a horizontal plane parallel to the frame on which the holder is mounted. The action of springs 14 and 19 in each embodiment, will permit front support member 3 to move in and back—providing flexibility of the holders and ease in removing and then returning a water bottle while the cyclist is riding the bicycle. The configuration of front support member 3 and springs 14 and 19 acting thereon, will also serve to securely retain the water bottle in holders 1 and 100 over periods of long usage.

Certain novel features and components of this invention are disclosed in detail in order to make the invention clear in at least one form thereafter. However, it is to be clearly understood that the invention as disclosed is not necessarily limited to the exact form and details as disclosed, since it is apparent that various modifications and changes may be made without departing from the spirit of the invention.

What is claimed:

1. A water bottle holder for attachment to a frame member of a bicycle, said holder comprising:

(a) a cage element for receiving and retaining a water bottle;

(b) cage element support means secured to the cage element for mountable attachment to the frame member, said cage element support means comprising an elongated slot;

(c) means to moveably mount the cage element support means in a horizontal plane over and parallel to the frame member, said means to moveably mount the cage element support means comprises pin means extending through the slot, whereby the cage element support means and the cage element are rotatably moveable from side to side about means within the horizontal plane over the frame member.

2. A water bottle as in claim 1 comprising flexible support means connected to the cage element, whereby a portion of the cage element is flexibly moveable toward and away from the frame member.

3. A water bottle holder as in claim 1 wherein the cage element comprises a main support member and a front support member.

4. A water bottle holder as in claim 3 wherein said cage element support means is a plate secured to the main support member.

5. A water bottle holder as in claim 2 in which the flexible support means comprises a spring support means and spring connecting pin.

6. A water bottle holder for attachment to a frame member of a bicycle, said holder comprising:

(a) a cage element for receiving and retaining a water bottle;

(b) cage element support means secured to the cage element for mountable attachment to the frame member;

(c) means to moveably mount the cage element support means in a horizontal plane over and parallel to the frame member, said means to moveably mount the cage element support means comprises a spring and sleeve means adapted to be mounted on the frame member, whereby the cage element support means and the cage element are rotatably moveable from side to side within the horizontal plane over the frame member.

* * * * *